April 27, 1965  W. J. LEHMANN  3,180,663
DISTORTION LOCK STRUCTURE AND METHOD
Filed Dec. 16, 1963
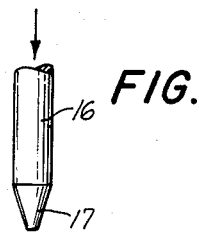
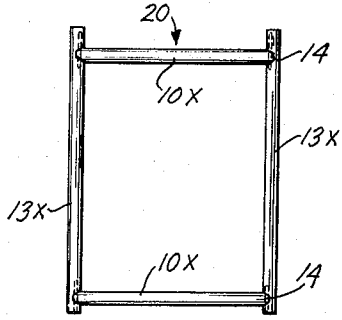
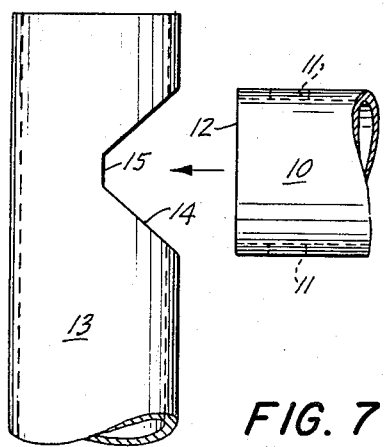
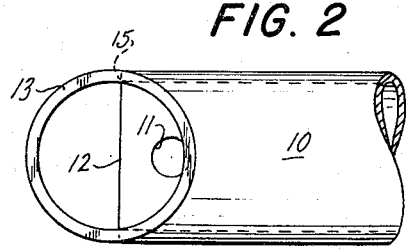
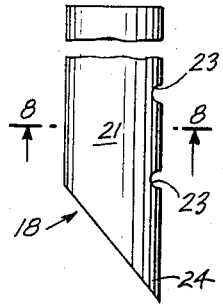
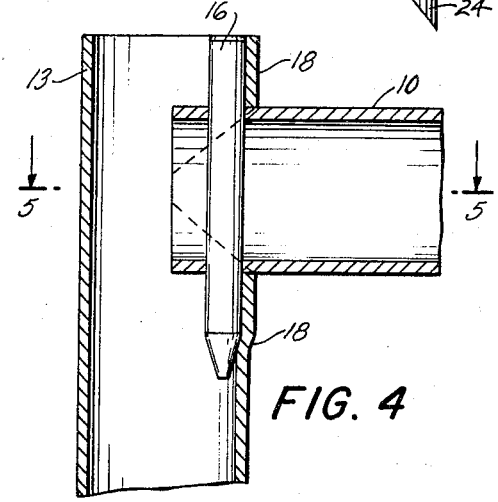
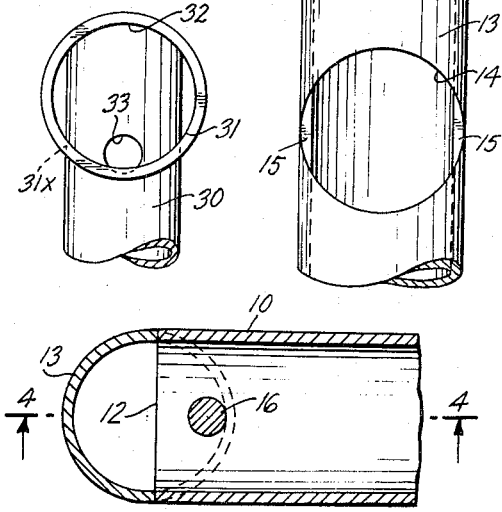

United States Patent Office 3,180,663
Patented Apr. 27, 1965

3,180,663
DISTORTION LOCK STRUCTURE AND
METHOD
Walter J. Lehmann, Westbury, N.Y.
(2487 Cedar Swamp Road, Brookville, N.Y.)
Filed Dec. 16, 1963, Ser. No. 330,877
2 Claims. (Cl. 285—189)

This invention relates to structural joints of tubular members and more particularly to joining a pair of tubular elements rigidly and preferably at a right angle to one another.

Many methods of joining one pipe to another are known, for example, welding, use of clamps, etc. Some of these are cumbersome to make. Others, and this includes welded joints, are often not able to stand the stresses and strains of rugged use as in gate construction for fences.

It is an object of this invention to provide a tubular structure of neat appearance like that of a welded joint.

It is another object to provide a mechanically prepared angular joining of two pipes to produce a structure of rigid immovable construction.

It is a further object to effect an inexpensive, rapid and permanent joining of two tubular elements without the need of special skills or tools.

These and other objects of this invention will become readily apparent upon reading the following descriptive disclosure taken in conjunction with the accompanying drawing in which;

FIG. 1 is an exploded view showing the three elements constituting the structural joint of this invention and showing further by means of arrows the manner of assembling the horizontally disposed suitably apertured pipe to a vertically disposed suitably notched pipe of equal diameter and the subsequent locking together of the assembled pipes by means of a long pin.

FIG. 2 is a top plan view of the assembled pipes of FIG. 1 before the insertion of the pin into the opposed apertures of the horizontally disposed pipe, and showing the critical offset relationship of the diametrically opposed apertures in relationship to the vertical wall of the vertically disposed pipe.

FIG. 3 is a front view of the notch of the vertically disposed pipe of FIG. 1, showing the opposed flat seat walls therein.

FIG. 4 is a transverse section view of the assembled structural joint showing the manner of distorting the vertically disposed pipe by the pin when driven through both apertures of the horizontally disposed pipe, and taken on line 4—4 of FIG. 5.

FIG. 5 is a section view taken on line 5—5 of FIG. 4 and showing the manner in which the vertical pipe is distorted so as to be able to accommodate the pin in the opposed apertures of the horizontal pipe.

FIG. 6 is a front view of a fence gate made from four suitably prepared pipes by means of four lock joints of this invention, FIG. 7 is a side view of a modified locking pin having an ovaloid cross section, FIG. 8 is a transverse section taken on line 8—8 of FIG. 7, and FIG. 9 is a top plan view of a modified structure wherein the end of a horizontal pipe of lesser diameter is seated against the inner rear wall surface of the vertical pipe in which it is inserted.

The important feature of this invention is the distortion locking by means of a pin of an inserted pipe having suitably located diametrically opposed apertures when suitably disposed inside a suitable opening of a second pipe.

To effect the distortion locking of the first or inserted pipe to the second pipe the apertures of the inserted pipe are disposed in partial offset relationship to the inside surface of the wall of the second pipe so that the driven insertion of a suitable pin will distort the second pipe out of true round thereby effecting a nesting of the pin surface in and against the distorted wall surface of the second pipe.

Turning now to the drawing and FIGS. 1 to 5 there is shown the assemblage and manner of assembling two pipes of equal diameter at a right angle to one another.

However, this invention is not limited to right angle joining of said pipes since it may be modified within the skill of the art to joining at other angles than that of the preferred right angle shown in FIGS. 1 to 6.

As shown in FIGS. 1 and 2, the horizontally disposed insertable tubular member or pipe 10 is provided with a pair of round apertures 11 at a suitable and critical distance from its insertable end 12.

Pipe 13 of a diameter equal to that of pipe 10 is provided with a truncated substantially V-shaped notch 14 as viewed from the side (FIG. 1), said notch being of a round configuration when viewed from the front (FIG. 3) being drilled or bored by a drill or a boring device of a diameter equal to that of pipe 10 and 13.

The notch or hole 14 is bored to a depth suitably less than the radius of the pipe 13 thereby forming a pair of diametrically opposed flat seats 15 adapted to receive the corresponding flat end 12 of pipe 10.

As shown in FIG. 2, the insertion of pipe 10 into notch 14 of pipe 13 seats the end 12 thereof against the pair of seats 15 of pipe 13. It also disposes both apertures 11 of pipe 10 in part under the notch 14 wall of pipe 13.

A drive pin 16 of a diameter equal to that of the round aperture 11 is provided with a conical nose 17, which latter is inserted in the top aperture 11 of pipe 10.

The pin 16 is tapped through this top aperture 11 and then into the bottom aperture 11 and finally driven in or home, thereby forming a rigid seating of the end 12 of pipe 10 to the pair of opposed flat walls 15 of pipe 13 to effect a true right angle configuration of the pipes 10 and 13.

As seen in FIG. 4, the longitudinal pin 16 is of a length greater than the diameter of pipe 10. Preferably it is a least twice as long or more than the diameter of pipe 10.

The forced insertion of pin 16 into both apertures 11 of pipe 10 forces the portion of the wall against which it moves of vertical pipe 13 to become distorted or to bulge outwardly to form a channel like distortion 18 therein and in which the pin 16 is disposed. This distortion arises because of the offset relationship of aperture 11 of pipe 10 to the pipe 13 wall of the aperture 14 thereof (FIG. 2).

Thus a critical feature of this invention is that of the distance of apertures 11 from the end of wall 12 of pipe 10. This distance being suitably greater than the distance from seat 15 to the inside surface of the wall of pipe 13.

This critical distance may be slightly variable due to the thickness of the tubing used and the amount of locking distortion desired in pipe 13.

The driven pin 16 (FIG. 4) effects a tight make up or locking arrangement, so that pipe 10 is immoveably and non-rotatably locked to pipe 13 since the pin 16 is nested in its distortion channel 18.

The gate 20 (FIG. 6) is made from pipe of equal diameter. A pair of pipes 10X are suitably apertured adjacent each of their ends to receive pins 16. Also a pair of pipes 13X are provided with suitably spaced apart V-notches 14.

Such a gate 20 is of rigid rectangular construction, suitable for long life without sagging.

In lieu of a round pin 16, an ovaloid pin 21 may be used provided its opposed ends 22 engage the ends of the co-acting ovaloid apertures suitably disposed in pipe 10. Pin 21 may be provided with suitably spaced notches 23 to engage the walls of the respective apertures disposed in pipe 10 thereby locking the pin 21 to the pipe 10. Furthermore, pin 21 may be provided with a tapered point 24 in lieu of a round nose.

Turning now to FIG. 9 there is shown a modification of this invention wherein a pipe 30 of lesser diameter is inserted into a pipe 31 of larger diameter having an aperture in its side wall to exactly receive said pipe 30. In this modification the end wall 32 of pipe 30 is curved to mate with the inside surface of pipe 31 to form a seat thereagainst.

To produce a suitable locking of pipe 30 to pipe 31 the diametrically opposed apertures 33 of pipe 30 are disposed in offset relationship to the pipe receiving aperture 31X of pipe 30 so that a drive pin 16 may push end wall 32 against pipe 31 with a corresponding distortion of pipe 31 where it engages said pin 16.

This invention has been described by means of several embodiments but it is not to be limited to these illustrations thereof.

Thus this invention while shown as suitable for gate and fence construction is also suitable for manufacture of tubular furniture and even tubular hardware, tubular scaffolds etc.

And while this joint is especially useful with metal tubing it may be used to join suitable plastic tubing.

I claim:

1. A distortingly locked right angle tubular joint comprising a first pipe having an aperture in the pipe wall therein, said aperture having an orthogonal projection defined by a circle, a second pipe of smaller diameter than said first pipe and substantially equal to the diameter of the projection of said aperture inserted in said aperture, said second pipe having an end portion adapted to be seated firmly against the inner wall of said first pipe opposite said aperture and having a pair of diametrically opposed pin receiving apertures normal to the axis of said second pipe and spaced from said end portion so as to intersect the plane of said aperture of said first pipe when the end portion of said second pipe is in firm engagement with said inner wall of said first pipe and a pin of a length greater than the diameter of said second pipe and of a diameter equal to said opposed apertures disposed inside said first pipe and forceably driven through said diametrically opposed apertures of said second pipe deforming the wall of said first pipe adjacent said aperture to produce an axial channel therein whereby said driven pin is immoveably and lockingly disposed in said channel.

2. A distortingly locked right angle tubular joint made from a pair of pipes of equal outside diameter comprising a first pipe having an aperture in the pipe wall therein, said aperture having an orthogonal projection defined by a circle, said aperture lying in a semicircular plane the diameter of which is equal to the outside diameter of said first and second pipes whereby a pair of opposed axial flat seat walls are defined in said first pipe wall, a second pipe having a flat end portion disposed in said first pipe and firmly seated against said opposed seat walls, said second pipe having a pair of diametrically opposed pin receiving apertures normal to its axis and so disposed from the seated end portion as to intersect the plane of said aperture of said first pipe, and a locking pin of a length greater than that of the outer diameter of said second pipe and having a pin diameter equal to that of the opposed apertures disposed interiorly of said first pipe and forceably through said opposed apertures thereby axially deforming the wall of said first pipe adjacent said aperture and forming an axial channel therein rigidly locking said pin.

References Cited by the Examiner

UNITED STATES PATENTS

| 230,254 | 7/80 | Eastman | 285—191 |
| 789,790 | 5/05 | Bigsby | 287—56 |
| 1,010,427 | 12/11 | Holden | 285—191 |
| 1,209,195 | 12/16 | Orillio. | |
| 2,614,827 | 10/52 | Peach | 285—222 X |
| 2,866,239 | 12/58 | Lambert. | |
| 3,062,567 | 11/62 | DeWitt | 285—189 |

FOREIGN PATENTS 129,618 10/50 Switzerland.

CARL W. TOMLIN, *Primary Examiner.*